US008686968B2

(12) United States Patent
Park et al.

(10) Patent No.: US 8,686,968 B2
(45) Date of Patent: Apr. 1, 2014

(54) TOUCH SCREEN PANEL

(75) Inventors: Jung-Mok Park, Yongin (KR);
Hwan-Hee Jeong, Yongin (KR);
Jae-Young Yu, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 280 days.

(21) Appl. No.: 12/979,799

(22) Filed: Dec. 28, 2010

(65) Prior Publication Data

US 2011/0279390 A1     Nov. 17, 2011

(30) Foreign Application Priority Data

May 14, 2010   (KR) .................. 10-2010-0045252

(51) Int. Cl.
| G06F 3/045 | (2006.01) |
| G06F 3/041 | (2006.01) |
| G09G 5/00 | (2006.01) |
| G06K 11/06 | (2006.01) |
| G08C 21/00 | (2006.01) |
| G06F 3/044 | (2006.01) |

(52) U.S. Cl.
USPC ........ 345/174; 345/156; 345/173; 178/18.01; 178/18.06

(58) Field of Classification Search
USPC .................. 345/173–178; 178/18.01–20.04
See application file for complete search history.

(56) References Cited

U.S. PATENT DOCUMENTS

| 2008/0138589 | A1* | 6/2008 | Wakabayashi et al. .... | 428/195.1 |
| 2010/0053532 | A1* | 3/2010 | Lai ................................. | 349/151 |
| 2010/0182253 | A1* | 7/2010 | Park et al. ...................... | 345/173 |
| 2010/0261119 | A1* | 10/2010 | Li et al. ......................... | 430/319 |

(Continued)

FOREIGN PATENT DOCUMENTS

| JP | 2010-140370 | 6/2010 |
| KR | 10-2001-0097782 A | 11/2001 |

(Continued)

OTHER PUBLICATIONS

KIPO Office Action dated Jul. 21, 2011, for Korean priority Patent application 10-2010-0045252, noting the listed references in this IDS, 1 page.

*Primary Examiner* — Bipin Shalwala
*Assistant Examiner* — Ilana Spar
(74) *Attorney, Agent, or Firm* — Christie, Parker & Hale, LLP

(57) ABSTRACT

A touch screen panel in which an occurrence of a scratch at intersections of coupling patterns respectively coupling first sensing cells and second sensing cells to each other in a first direction and in a second direction is prevented. The touch screen panel includes a transparent substrate, sensing patterns formed on a surface of the transparent substrate. The sensing patterns include first sensing cells disposed along a first direction, second sensing cells disposed between the first sensing cells along a second direction intersecting the first direction, first coupling patterns coupling the first sensing cells to each other in the first direction, second coupling patterns coupling the second sensing cells to each other in the second direction, and an insulating layer disposed between the first coupling patterns and the second coupling patterns at intersections of the first coupling patterns and the second coupling patterns. The insulating layer includes a concave part formed below the second coupling patterns in an area where the first coupling patterns and the second coupling patterns intersect and a protruding part positioned around the concave part so as to have a height higher than the concave part.

20 Claims, 4 Drawing Sheets

(56) References Cited

U.S. PATENT DOCUMENTS

2010/0263944 A1* 10/2010 Lin et al. .................. 178/18.06
2010/0309160 A1* 12/2010 Lin ............................. 345/174
2011/0234526 A1* 9/2011 Mi ............................... 345/174

FOREIGN PATENT DOCUMENTS

| KR | 10-2008-0096352 A | 10/2008 |
|----|-------------------|---------|
| KR | 10-2008-0110477   | 12/2008 |
| KR | 10-2009-0058072   | 6/2009  |

* cited by examiner

TOUCH SCREEN PANEL

CROSS-REFERENCE TO RELATED APPLICATION

This application claims the benefit of Korean Application No. 10-2010-0045252, filed May 14, 2010, in the Korean Intellectual Property Office, the disclosure of which is incorporated herein by reference.

BACKGROUND

1. Field

Aspects of the present invention relate to a touch screen panel, and more particularly, to a touch screen panel in which occurrence of a deformation, such as a scratch, is minimized at the intersections of coupling patterns coupling first sensing cells and second sensing cells respectively in a first direction and a second direction.

2. Description of the Related Art

A touch screen panel is an input device allowing a human hand or an object to input a command of a user to select content displayed on the screen of an image display device. Therefore, the touch screen panel is disposed on a front face of the image display device and converts a point of contact of the human hand or the object into an electrical signal. Therefore, the content selected at the contact position is received as an input signal. Since the touch screen panel may replace an input device coupled to the image display device, such as a keyboard, a mouse, or a similar external input device, use of the touch screen panel is increasing.

Methods of realizing a touch sensing method of a touch screen panel include a resistance layer method, a photo-sensing method, and an electrostatic capacity method. Among the above, in the touch screen panel using the electrostatic capacity method, when an object, such as a human hand or a stylus pen, contacts the touch screen panel, conductive sensing cells sense a change in electrostatic capacitance of sensing cells or a ground electrode at the contact point. The position of the contact point where the change in electrostatic capacitance occurs is converted into an electrical signal.

The touch screen panel using the electrostatic capacity method includes first sensing cells coupled in a first direction, first coupling patterns coupling the first sensing cells in the first direction, second sensing cells coupled in a second direction, and second coupling patterns coupling the second sensing cells in the second direction so that the coordinates of the contact position are detected.

The first sensing cells and the second sensing cells are alternately arranged in a same layer so that an entirety of the touch screen panel has a uniform reflectivity. Since the first coupling patterns and the second coupling patterns intersect each other, an insulating layer is disposed between the first coupling patterns and the second coupling patterns.

The first coupling patterns and the second coupling patterns are formed of fine patterns in comparison to the first sensing cells and the second sensing cells. In particular, at the intersections of the first coupling patterns and the second coupling patterns, step differences exist due to a lamination structure of the first coupling patterns and the second coupling patterns and the insulating layer interposed therebetween. Therefore, a scratch is easily formed at the intersections of the first coupling patterns and the second coupling patterns during manufacturing processes or during handing of products. Thus, a defect in the touch screen panel may occur due to the damaged first and second coupling patterns.

SUMMARY OF THE INVENTION

Aspects of the present invention provide a touch screen panel capable of preventing defect from a scratch at intersections of first coupling patterns and second coupling patterns respectively coupling first sensing cells and second sensing cells in a first direction and a second direction.

Aspects of the present invention provide a touch screen panel, including a transparent substrate, sensing patterns formed on a surface of the transparent substrate. The sensing patterns include first sensing cells disposed along a first direction, second sensing cells disposed between the first sensing cells along a second direction intersecting the first direction, first coupling patterns coupling the first sensing cells to each other in the first direction, second coupling patterns coupling the second sensing cells to each other in the second direction, and an insulating layer disposed between the first coupling patterns and the second coupling patterns at intersections of the first coupling patterns and the second coupling patterns. The insulating layer includes a concave part formed below the second coupling patterns in an area where the first coupling patterns and the second coupling patterns intersect and a protruding part positioned around the concave part so as to have a height higher than the concave part.

According to another aspect of the present invention, the protruding part of the insulating layer is formed at sides of the concave part.

According to another aspect of the present invention, a sum of a height of the concave part and a height of a part of the second coupling patterns disposed on the concave part is no more than the height of the protruding part.

According to another aspect of the present invention, the touch screen panel further includes a step layer disposed under the protruding part.

According to another aspect of the present invention, a sum of a thickness of the protruding part and a thickness of the step layer is no less than the sum of a thickness of the concave part and a thickness of the part of the second coupling patterns disposed on the concave part.

According to another aspect of the present invention, the touch screen panel may further include position detecting lines formed in a touch non-active area of the touch screen panel, wherein the touch non-active area is disposed at an edge of a touch active area of the touch screen panel, the touch active area having the sensing patterns, wherein the position detecting lines couple the sensing patterns to an external driving circuit.

According to another aspect of the present invention, the touch screen panel further includes a step layer disposed under the protruding part and formed of the same material as the position detecting lines.

According to another aspect of the present invention, the second sensing cells and the second coupling patterns are patterned to be formed as one body in a column direction or a row direction. The first sensing cells are patterned between the second sensing cells to be separate patterns and the first sensing cells are coupled to each other by the first coupling patterns in a row direction or a column direction.

According to aspects of the present invention, the insulating layer disposed between the first coupling patterns and the second coupling patterns at the intersections of the first coupling patterns and the second coupling patterns includes the concave part formed on a part of the second coupling patterns that intersects the first coupling patterns. The sum of the height of the concave part of the insulating layer and the height of the second coupling patterns disposed on the concave part is no more than the height of the protruding part of the insulating layer, which is positioned around the concave part.

According to aspects of the present invention, the part of the second coupling patterns disposed on top of the first coupling patterns are positioned to be lower than the protruding part of the insulating layer. Thus, defects caused by a scratch at the intersections of the first coupling patterns and the second coupling patterns may be prevented.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
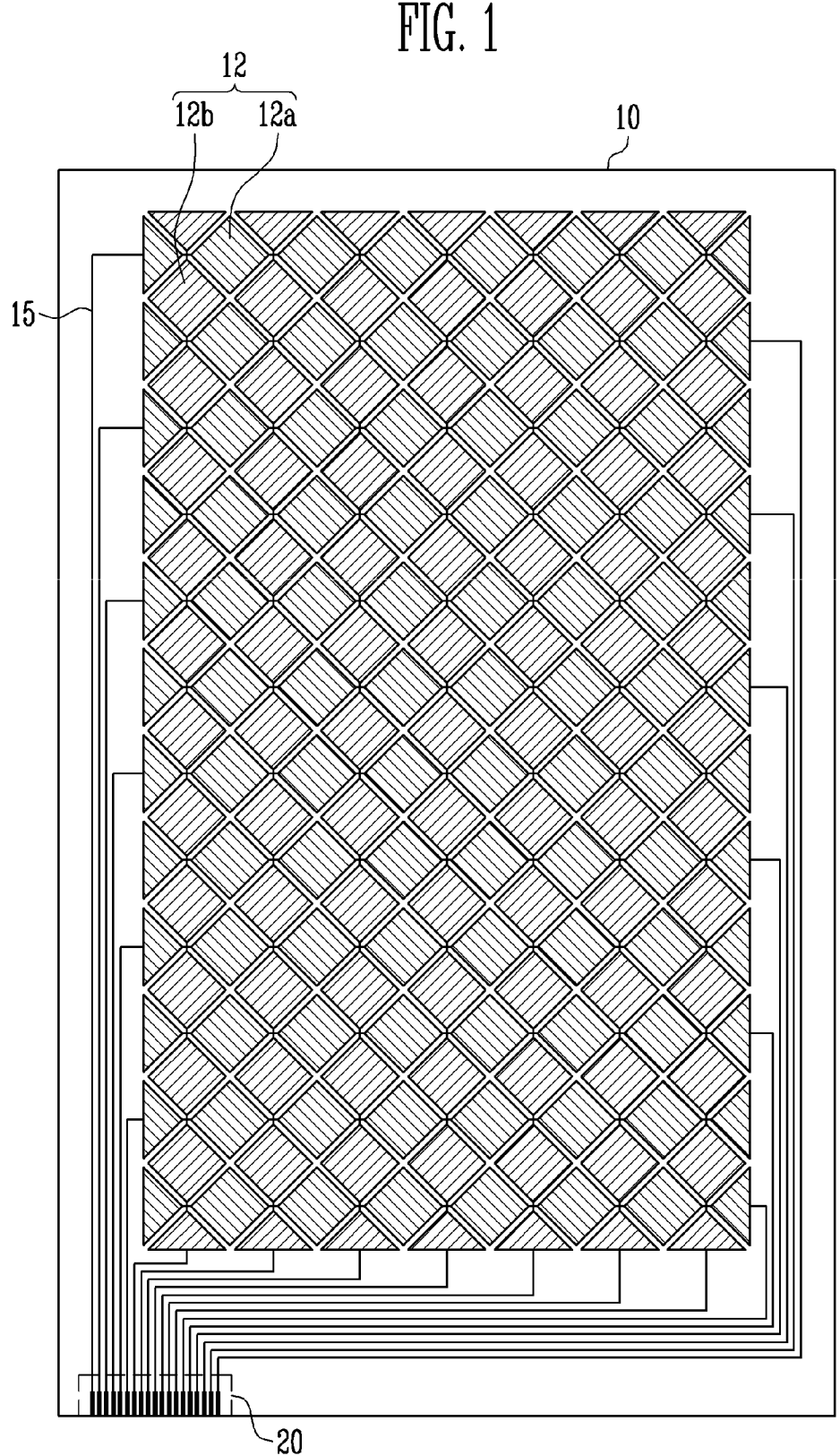
FIG. 1 is a plan view schematically illustrating a touch screen panel according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

As referred to herein, when a first element, item or layer is said to be disposed or formed "on", or "adjacent to", a second element, item or layer, the first element, item or layer can directly contact the second element, item or layer, or can be separated from the second element, item or layer by one or more other elements, items or layers located therebetween. In contrast, when an element, item or layer is referred to as being disposed or formed "directly on" another element, item or layer, there are no intervening elements, items or layers present.

Figure 2:
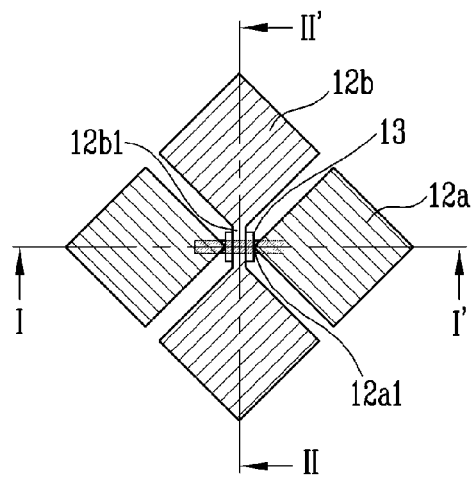
FIG. 2 is a view illustrating an example of a sensing pattern of FIG. 1 whose main part is enlarged.

FIG. 1 is a plan view schematically illustrating a touch screen panel according to an embodiment of the present invention. FIG. 2 is a view illustrating an example of a sensing pattern of FIG. 1 whose main part is enlarged. Referring to FIGS. 1 and 2, the touch screen panel includes a transparent substrate 10, sensing patterns 12 formed on a surface of a touch active area of the transparent substrate 10, position detecting lines 15 formed on a surface of a touch non-active area of the transparent substrate 10, and a pad unit 20.

The sensing pattern 12 includes first sensing cells 12a coupled in a first direction, for example, in a row direction. The sensing pattern 12 also includes second sensing cells 12b coupled in a second direction intersecting the first direction, for example, in a column direction disposed orthogonal to the row direction between adjacent ones of the first sensing cells 12a.

As illustrated in FIG. 2, the sensing pattern 12 includes first coupling patterns 12a1 coupling the first sensing cells 12a in the first direction, second coupling patterns 12b1 coupling the second sensing cells 12b in the second direction, and an insulating layer 13 interposed between the first coupling patterns 12a1 and the second coupling patterns 12b1. The insulating layer 13 is disposed at the intersections of the first coupling patterns 12a1 and the second coupling patterns 12b1.

The first sensing cells 12a are formed of a transparent electrode material, such as indium-tin-oxide (ITO), and are coupled to each other in the first direction. A row of the first sensing cells 12a is coupled to a corresponding one of the position detecting lines 15. The first sensing cells 12a are patterned to be separate patterns between the second sensing cells 12b and are coupled to each other by the first coupling patterns 12a1. The first coupling patterns 12a1 are disposed under the first sensing cells 12a along the first direction in a row or column direction. FIGS. 1 and 2, show the first sensing cells 12a are coupled to each other in a row direction, however, aspects of the present invention are not limited thereto, and the first sensing cells 12a may be coupled to each other in other suitable directions. The first coupling patterns 12a1 are formed in a process different from a process of forming the first sensing ells 12a. One area of the first coupling patterns 12a1 contacts the first sensing cells 12a to couple the first sensing cells 12a in the first direction and to electrically connect adjacent ones of the first sensing cells 12a.

The second sensing cells 12b are formed of a transparent electrode material, such as ITO. The second sensing cells 12b are arranged in a same layer as the first sensing cells 12a. The second sensing cells 12b are patterned to be coupled to each other in a second direction different from the first direction. For example, as illustrated in FIG. 2, the second sensing cells 12b are disposed in a column direction and are insulated from the first sensing cells 12a. The second sensing cells 12b disposed in the column direction are coupled to the position detecting lines 15.

That is, the second sensing cells 12b are patterned to be coupled to each other in the second direction in a patterning process. For example, as illustrated in FIG. 2, the second sensing cells 12b may be patterned to be formed integrally with the second coupling patterns 12b1 in the second direction in the column direction. In other words, the second sensing cells 12b and the second coupling patterns 12b1 may be formed to be one body. However, aspects of the present invention are not limited thereto, and the second sensing cells 12b and the second coupling patterns 12b1 may be formed to be separate bodies, and the second sensing cells 12b may be coupled to each other in other suitable directions.

The insulating layer 13 is disposed between the first coupling patterns 12a1 and the second coupling patterns 12b1 at the intersections of the first coupling patterns 12a1 and the second coupling patterns 12b1. The insulating layer 13 insulates between the first coupling patterns 12a1 and the second coupling patterns 12b1.

The position detecting lines 15 connect the sensing patterns 12 to the pad unit 20. The pad unit 20 may be connected to an external driving circuit (not shown), such as a position detecting circuit, or other similar circuits.

The position detecting lines 15 are disposed in a periphery of the touch screen panel so as to not be in the touch active area of the transparent substrate 10. Thus, the position detecting lines 15 are not formed in an area on which an image is displayed. The position detecting lines 15 are formed of a low resistance material such as Mo, Ag, Ti, Cu, Al, and Mo/Al/Mo. The position detecting lines are formed of a material other than a material of the transparent electrode forming the first and second sensing cells 12a and 12b.

In the touch screen panel using the electrostatic capacitance method, according to the present embodiment, when an object, such as a human hand or a stylus pen, contacts the touch screen panel at a contact position, a change in electrostatic capacitance at the contact position is transmitted from the sensing patterns 12 to the external driving circuit via the position detecting lines 15 and the pad unit 20. Then, the change in the electrostatic capacitance is converted into an electrical signal by an X and Y input processing circuit (not shown) in order to determine a contact position location. Additionally, the touch screen panel, according to the present embodiment, may be formed on an independent substrate to be attached to a top surface of an image display device or may be integrated with a display panel of the image display device.

The first coupling patterns 12a1 and the second coupling patterns 12b1 are formed of smaller patterns in comparison to the first sensing cells 12a and the second sensing cells 12b. Step differences, or in other words, differences in height, exist at the intersections of the first coupling patterns 12a1 and the second coupling patterns 12b1. The step difference is due to a lamination structure of the first coupling patterns 12a1 and the second coupling patterns 12b1, and a lamination structure of the insulating layer 13. That is, the intersections of the first coupling patterns 12a1 and the second coupling patterns 12b1 are formed to be higher than an area in which the first sensing cells 12a and the second sensing cells 12b are positioned.

Therefore, a scratch may be easily occur at the intersections between the first coupling patterns 12a1 and the second coupling patterns 12b1 during manufacturing processes or during handling of the products. In particular, when the scratch occurs in the second coupling patterns 12b1 positioned above the first coupling patterns 12a1, damage to the second coupling patterns 12a1 may result in a defect, such as short circuit such that a defect in operation of the touch screen panel may result. Therefore, according to aspects of the present invention, a touch screen panel in which a defect caused by the scratch at the intersections of the first coupling patterns 12a1 and the second coupling patterns 12b1 is prevented from being generated is provided.

Figure 3:
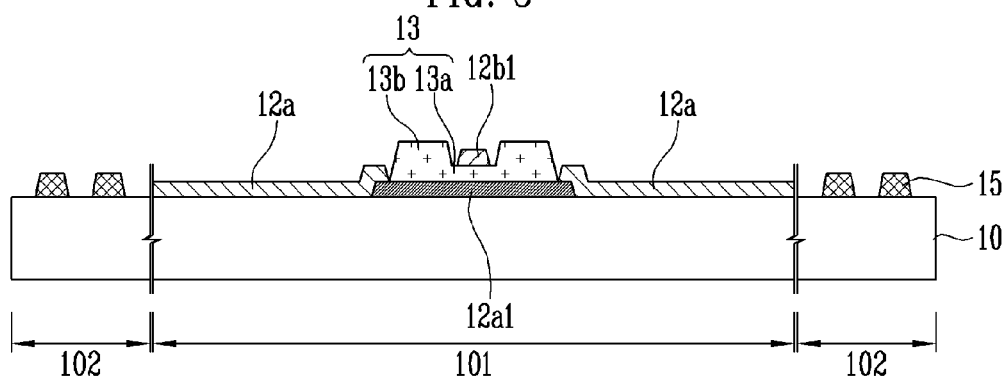
FIG. 3 is a sectional view illustrating a main part of the touch screen panel taken along the line I-I' of FIG. 2.
Figure 4:
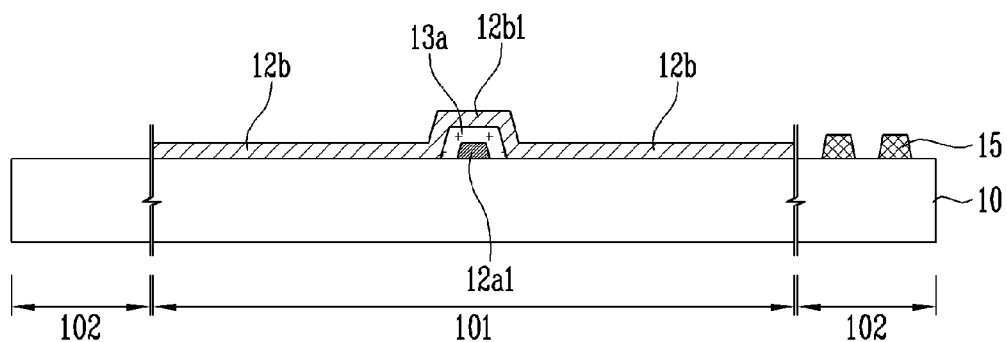
FIG. 4 is a sectional view illustrating the main part of the touch screen panel taken along the line II-II' of FIG. 2.

FIG. 3 is a sectional view illustrating the main part of the touch screen panel taken along the line I-I' of FIG. 2. FIG. 4 is a sectional view illustrating the main part of the touch screen panel taken along the line II-II' of FIG. 2. When the structure of the touch screen panel, according to an embodiment of the present invention, is described in detail with reference to FIGS. 3 and 4 in connection with FIGS. 1 and 2, the touch screen panel includes a touch active area 101 in the center of the touch screen panel and a touch non-active area 102 in the periphery of the touch screen panel.

The touch active area 101 includes the first coupling patterns 12a1 formed on a surface of a transparent substrate 10, and the insulating layer 13 formed on the first coupling patterns 12a1 so as to expose an area of the first coupling patterns 12a1. The touch active area 101 further includes the first sensing cells 12a coupled to the first coupling patterns 12a1 through the exposed area of the first coupling patterns 12a1, and the second sensing cells 12b formed between the first sensing cells 12a so as to be insulated from the first sensing cells 12a. The second sensing cells 12b are coupled to each other through the second coupling patterns 12b1, which are integrally formed on the insulating layer 13 in the second direction. That is, according to aspects of the present invention, the insulating layer 13 is disposed at the intersections of the first coupling patterns 12a1 and the second coupling patterns 12b1 in order to prevent a short between the first coupling patterns 12a1 and the second coupling patterns 12b1.

As illustrated in FIG. 3, the insulating layer 13 exposes an area of the first coupling patterns 12a1 and the first coupling patterns 12a1 are coupled to the first sensing cells 12a through the exposed area. That is, the first sensing cells 12a directly contact the first coupling patterns 12a1 through the exposed area of the first coupling patterns 12a1, and thus, the first sensing cells 12a are electrically coupled to each other in the first direction.

The touch active area 101 is formed to be transparent so that light from a display panel (not shown) disposed under the touch screen panel may be transmitted through the touch screen panel. That is, the first and second sensing cells 12a and 12b, the second coupling patterns 12b1, and the insulating layer 13 are formed of a transparent material, having no less than a predetermined transmittance. According to aspects of the present invention, transparent refers to being 100% transparent as well as having a high transmittance.

Therefore, the first and second sensing cells 12a and 12b and the second coupling patterns 12b1 are formed of the transparent material such as ITO and the insulating layer 13 is formed of a transparent insulating material such as a silicon oxide layer ($SiO_2$). However, aspects of the present invention are not limited thereto and the first and second sensing cells 12a and 12b and the insulating layer 13 may be formed of other suitable materials.

The first coupling patterns 12a1 are formed of the transparent electrode material similar to that of the first and second sensing cells 12a and 12b and the second coupling patterns 12b1 or may be formed of a low resistance metal like that used to form the position detecting lines 15. When the first coupling patterns 12a1 are formed of an opaque low resistance metal, it is possible to prevent to the first coupling patterns 12a1 from being visible by controlling the width, length, and thickness of the first coupling patterns 12a1.

The touch non-active area 102 that is not visible due to being covered from viewing by an outline layer, such as a black matrix (BM) (not shown), includes the position detecting lines 15 and the pad unit 20. In other words, the position detecting lines 15 and the pad unit 20, which are disposed in the touch non-active area 102, are not visible because they are disposed beneath the black matrix.

According to aspects of the present invention, the insulating layer 13 includes a concave part 13a formed between the first coupling patterns 12a1 and the second coupling patterns 12b1. A protruding part 13b is formed around the concave part 13a to be higher than the concave part 13a. For example, as illustrated in FIG. 3, the concave part 13a is formed below where the second coupling patterns 12b1 are positioned and the protruding part 13b is formed on both sides of the concave part 13a.

As illustrated in FIG. 4, the second coupling patterns 12b1 are coupled to the second sensing cells 12b by being disposed over the concave part 13a of the insulating layer. A sum of the height of the concave part 13a of the insulating layer 13 and a height of the second coupling patterns 12b1 positioned on the concave part 13a is no more than a height of the protruding part 13b around the concave part 13a. In other words, the sum of the height of the concave part 13a of the insulating layer and the height of the second coupling patterns 12b1 positioned on the concave part 13a is set to be lower than the height of the protruding part 13b. However, aspects of the present invention are not limited thereto, an the sum of the height of the concave part 13a and the second coupling patterns 12b1 may be other suitable heights.

Therefore, occurrence of a scratch at the intersections of the first and second coupling patterns 12a1 and 12b1. In particular, a scratch occurring in an area of the second coupling patterns 12b1 that is disposed over the insulating layer 13 is prevented from occurring.

As described above, according to aspects of the present invention, the insulating layer 13 is interposed between the first coupling patterns 12a1 and second coupling patterns 12b1 includes the concave part 13a. The concave part 13a is formed below the area having the second coupling patterns 12b1. Also, the sum of the height of the concave part 13a and the height of the second coupling patterns 12b1 is set to be no more than the height of the protruding part 13b, which is disposed around the concave part 13a. Therefore, the first and the second coupling patterns 12a1 and 12b1 are lower than the protruding part 13b so that defect in operating the touch screen panel, caused by a scratch at the intersections of the first coupling patterns 12a1 and the second coupling patterns 12b1 may be prevented.

Additionally, according to the present embodiment of the present invention described above with reference to FIGS. 3 and 4, the insulating layer 13 is divided into the concave part 13a and the protruding part 13b by patterning the insulating layer 13 to have different thicknesses using a half-tone mask. However, aspects of the present invention are not limited to the above. For example, at least one step layer may be previously formed under the area where the protruding part 13b of the insulating layer is to be formed. Thus, the concave part 13a and the protruding part 13b may be formed in the insulating layer 13 without using the half-tone mask. The above-described embodiment will be described later with reference to FIG. 5.

Figure 5:
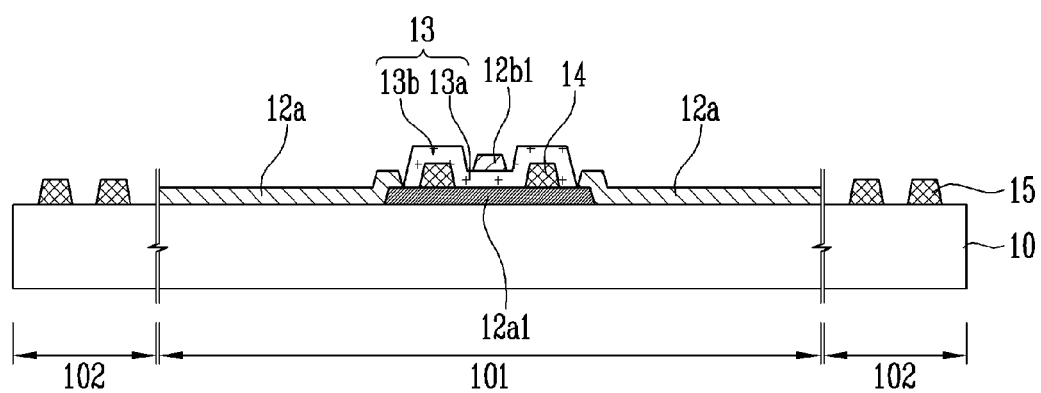
FIG. 5 is a sectional view illustrating the main part of a touch screen panel according to another embodiment of the present invention.

FIG. 5 is a sectional view illustrating the main part of a touch screen panel according to another embodiment of the present invention. FIG. 5 illustrates the section of the main part of the touch screen panel taken along the line I-I' of FIG. 2 as illustrated in FIG. 3. Same components as those shown in FIG. 3 are denoted by same reference numerals and a detailed description thereof will be omitted. Referring to FIG. 5, a touch screen panel includes a step layer 14 positioned under the protruding part 13b of the insulating layer 13.

As described above, when the step layer 14 is formed under the protruding part 13b of the insulating layer, a step difference, or a change in height, is generated in the insulating layer 13 formed on the step layer 14. Thus, the concave part 13a and the protruding part 13b are formed in the insulating layer 13 without using the half-tone mask. On the other hand, according to the present embodiment, a sum of the thickness of the protruding part 13b of the insulating layer and the thickness of the step layer 14 is no less than the sum of the thickness of the concave part 13a of the insulating layer and the thickness of the second coupling pattern 12b1, positioned on the concave part 13a.

In particular, the step layer 14 has a thickness larger than the thickness of the second coupling patterns 12b1. In this case, the second coupling patterns 12b1 positioned on the concave part 13a of the insulating layer are positioned to be lower than the protruding part 13b of the insulating layer.

Therefore, the occurrence of the scratch in the second coupling patterns 12b1 is effectively prevented so that defect in operating the touch screen panel caused by the scratch at the intersections of the first coupling patterns 12a1 and the second coupling patterns 12b1 may be prevented.

The step layer 14 is formed of a same material as the position detecting lines 15 and is formed during same manufacturing processes of forming the position detecting lines 15. The width or area of the step layer 14 is controlled so that the step layer 14 is prevented from being visible. That is, the step layer 14 is formed of the same material as the position detecting lines 15. In this case, since additional manufacturing processes forming the step layer 14 are not added, manufacturing of the touch screen panel may be improved. In addition, a resistance around a contact area of the first sensing cells 12a and the first coupling patterns 12a1 may be reduced. However, aspects of the present invention are not limited to the above and the step layer 14 may be formed of a transparent electrode material, an additional insulating material or other suitable materials.

As shown in FIGS. 2 through 5, the first coupling patterns 12a1 are positioned under the insulating layer 13 and the second coupling patterns 12b1 are positioned above the insulating layer 13. However, aspects of the present invention are not limited to the above. For example, the second coupling patterns 12b1 may be positioned under the insulating layer 13 and the first coupling patterns 12a1 may be positioned above the insulating layer 13, or the first and second coupling patterns 12a1 and 12b1 may be disposed at other suitable positions.

Figure 6:
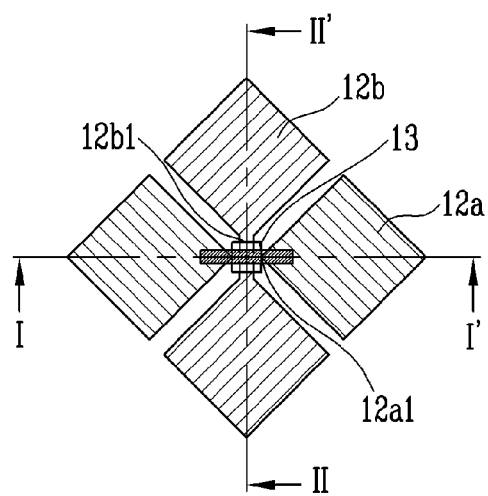
FIG. 6 is a view illustrating another example of the sensing pattern of FIG. 1 whose main part is enlarged.
Figure 7:
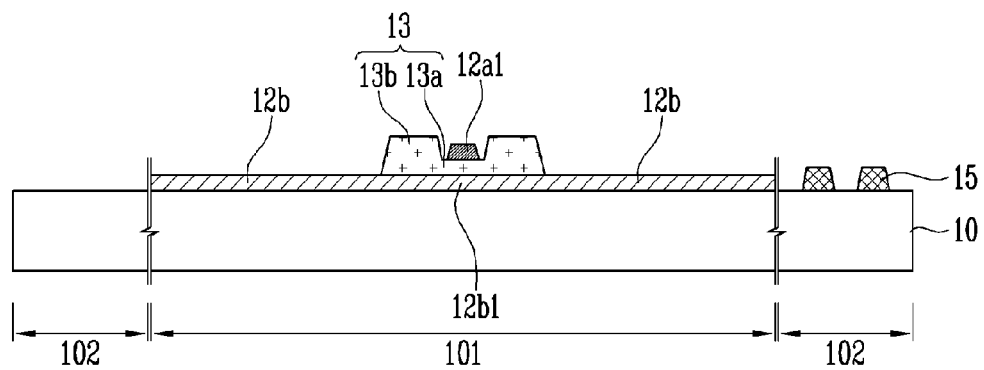
FIG. 7 is a sectional view illustrating the main part of the touch screen panel taken along the line II-II' of FIG. 6.
Figure 8:
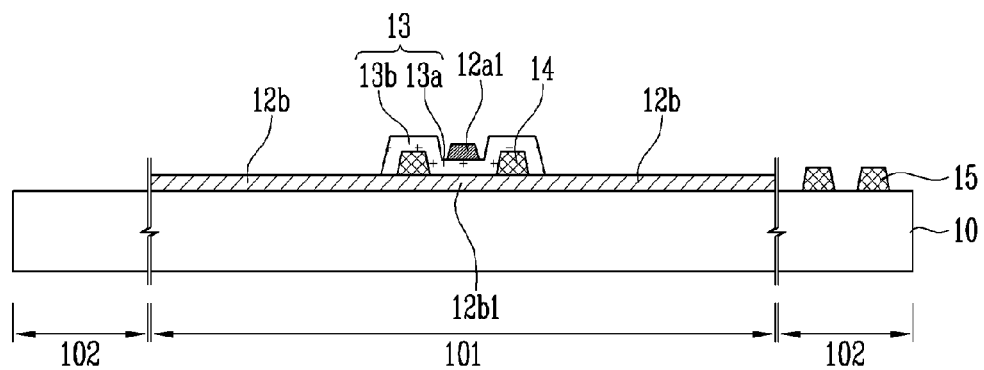
FIG. 8 is a sectional view illustrating the main part of a touch screen panel according to another embodiment of the present invention.

FIG. 6 is a view illustrating another example of the sensing patterns 12 of FIG. 1 whose main part is enlarged. FIG. 7 is a sectional view illustrating the main part of the touch screen panel taken along the line II-II' of FIG. 6. FIG. 8 is a sectional view illustrating the main part of a touch screen panel according to another embodiment of the present invention. In FIGS. 6 to 8, the same components as shown in FIGS. 2 through 5 are denoted by the same reference numerals and detailed description thereof will be omitted.

Referring to FIG. 6, in the sensing patterns 12, according to the present embodiment of the present invention, the first coupling patterns 12a1 are positioned above the insulating layer 13 and the second coupling patterns 12b1 are positioned under the insulating layer 13. In this case, the first coupling patterns 12a1 are positioned on the concave part 13a of the insulating layer. As illustrated in FIG. 7, a thicknesses of the concave part 13a and a thickness of the protruding part 13b of the insulating layer and are different. Thus, a step difference, or a difference in height, is formed in the insulating layer 13. In this case, a sum of the thickness of the concave part 13a and the thickness of the first coupling patterns 12a1 formed on the concave part 13a is set to be no more than a thickness of the protruding part 13b.

In addition, as illustrated in FIG. 8, when the step difference is formed in the insulating layer 13 by the step layer 14, the sum of the thickness of the concave part 13a and the thickness of the first coupling patterns 12a1 on the concave part 13a is no more than the sum of the thickness of the protruding part 13b and the thickness of the step layer 14 disposed under the protruding part 13b.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A touch screen panel, comprising:
a transparent substrate;
sensing patterns formed on a surface of the transparent substrate, the sensing patterns comprising:
first sensing cells disposed along a first direction;
second sensing cells disposed between the first sensing cells along a second direction intersecting the first direction and arranged in a same layer as that of the first sensing cells;
first coupling patterns coupling the first sensing cells to each other in the first direction;
second coupling patterns coupling the second sensing cells to each other in the second direction; and
an insulating layer disposed between the first coupling patterns and the second coupling patterns at intersections of the first coupling patterns and the second coupling patterns, the insulating layer comprising:
a concave part formed below the second coupling patterns in an area where the first coupling patterns and the second coupling patterns intersect, wherein the concave part is configured to house at least a portion of the second coupling pattern in a concavity formed by the concave part; and
a protruding part positioned around the concave part so as to have a height higher than the concave part.

2. The touch screen panel as claimed in claim 1, wherein the protruding part of the insulating layer is formed at sides of the concave part.

3. The touch screen panel as claimed in claim 1, wherein a sum of a height of the concave part and a height of a part of the second coupling patterns disposed on the concave part is no more than a height of the protruding part.

4. The touch screen panel as claimed in claim 1, further comprising a step layer disposed under the protruding part.

5. The touch screen panel as claimed in claim 4, wherein a sum of a thickness of the protruding part and a thickness of the step layer is no less than a sum of a thickness of the concave part and a thickness of the part of the second coupling patterns disposed on the concave part.

6. The touch screen panel as claimed in claim 1, further comprising position detecting lines formed in a touch non-active area of the touch screen panel,
wherein the touch non-active area is disposed at an edge of a touch active area of the touch screen panel, the touch active area having the sensing patterns, and
wherein the position detecting lines couple the sensing patterns to an external driving circuit.

7. The touch screen panel as claimed in claim 6, further comprising:
a step layer disposed under the protruding part and formed of a same material as the position detecting lines.

8. The touch screen panel as claimed in claim 1, wherein the second sensing cells and the second coupling patterns are patterned to be formed as one body in a column direction or a row direction, and
wherein the first sensing cells are patterned between the second sensing cells to be separate patterns, and
wherein the first sensing cells are coupled to each other by the first coupling patterns in a row direction or a column direction.

9. The touch screen panel as claimed in claim 8 wherein the row direction corresponds to one of the first direction or the second direction and the column direction corresponds to the other of the first direction or the second direction.

10. The touch screen panel as claimed in claim 6, further comprising a pad unit disposed in the touch non-active area to connect the position detecting lines to the external driving circuit.

11. A touch screen panel having a transparent substrate including a touch active area and a touch non-active area disposed at a periphery of the touch active area, the touch screen panel comprising:
sensing patterns formed in the touch active area, the sensing patterns comprising first sensing cells disposed along a first direction and second sensing cells along a second direction, wherein the second sensing cells are arranged in a same layer as that of the first sensing cells; and
an insulating layer disposed on the transparent substrate, wherein at least a portion of the insulating layer extends to a height greater than a height of the first sensing cells and the second sensing cells,
wherein the sensing patterns comprise:
first coupling patterns coupling the first sensing cells to each other in the first direction; and
second coupling patterns coupling the second sensing cells to each other in the second direction; and
wherein the insulating layer comprises:
a concave part formed below the second coupling patterns in an area where the first coupling patterns and the second coupling patterns intersect; and
a protruding part positioned around the concave part so as to have a height higher than the concave part,
wherein the insulating layer is formed between the first coupling patterns and the second coupling patterns at intersections of the first coupling patterns and the second coupling patterns.

12. The touch screen panel as claimed in claim 11, wherein the protruding part of the insulating layer is formed at sides of the concave part.

13. The touch screen panel as claimed in claim 11, wherein a sum of a height of the concave part and a height of a part of the second coupling patterns disposed on the concave part is set to be no more than a height of the protruding part.

14. The touch screen panel as claimed in claim 11, further comprising a step layer disposed under the protruding part.

15. The touch screen panel as claimed in claim 14, wherein a sum of a thickness of the protruding part and a thickness of the step layer is no less than a sum of a thickness of the concave part and a thickness of the part of the second coupling patterns disposed on the concave part.

16. The touch screen panel as claimed in claim 11, further comprising position detecting lines formed in a touch non-active area of the touch screen panel,
wherein the touch non-active area is disposed at an edge of a touch active area of the touch screen panel, the touch active area having the sensing patterns, and
wherein the position detecting lines couple the sensing patterns to an external driving circuit.

17. The touch screen panel as claimed in claim 16, further comprising:
at least one step layer disposed under a protruding part and formed of a same material as the position detecting lines.

18. The touch screen panel as claimed in claim 11, wherein the second sensing cells and the second coupling patterns are patterned to be formed as one body in a column direction or a row direction, and
wherein the first sensing cells are patterned between the second sensing cells to be separate patterns, and wherein the first sensing cells are coupled to each other by the first coupling patterns in a row direction or a column direction.

19. The touch screen panel as claimed in claim 18 wherein the row direction corresponds to one of the first direction or the second direction and the column direction corresponds to the other of the first direction or the second direction.

20. The touch screen panel as claimed in claim 16, further comprising a pad unit disposed in the touch non-active area to connect the position detecting lines to the external driving circuit.

* * * * *